US012734598B2

(12) United States Patent
Persson et al.

(10) Patent No.: US 12,734,598 B2
(45) Date of Patent: Sep. 15, 2026

(54) THREAD MILLING TOOL AND THREAD MILLING INSERT

(71) Applicant: SECO TOOLS AB, Fagersta (SE)

(72) Inventors: Hans Persson, Fagersta (SE); Emmanuel Ruard, Fagersta (SE); Anurag Jagdhane, Fagersta (SE)

(73) Assignee: SECO TOOLS AB, Fagersta (SE)

( * ) Notice: Subject to any disclaimer, the term of this patent is extended or adjusted under 35 U.S.C. 154(b) by 635 days.

(21) Appl. No.: 18/039,855

(22) PCT Filed: Nov. 22, 2021

(86) PCT No.: PCT/EP2021/082402
§ 371 (c)(1),
(2) Date: Jun. 1, 2023

(87) PCT Pub. No.: WO2022/117375
PCT Pub. Date: Jun. 9, 2022

(65) Prior Publication Data

US 2024/0001466 A1 Jan. 4, 2024

(30) Foreign Application Priority Data

Dec. 2, 2020 (EP) .................................... 20211239

(51) Int. Cl.
*B23G 5/18* (2006.01)
*B23C 5/10* (2006.01)

(52) U.S. Cl.
CPC ................ *B23G 5/18* (2013.01); *B23C 5/109* (2013.01); *B23C 2200/0416* (2013.01); *B23G 2200/10* (2013.01)

(58) Field of Classification Search
CPC .................................. B23G 5/18; B23C 5/109
See application file for complete search history.

(56) References Cited

U.S. PATENT DOCUMENTS 6,499,917 B1 * 12/2002 Parker .................. B23C 5/2247 407/47
2001/0018010 A1 8/2001 Kichin
(Continued)

FOREIGN PATENT DOCUMENTS

EP 2420340 A1 2/2012
WO 01/00362 A1 1/2001
(Continued)

OTHER PUBLICATIONS

Machine translation of WO-2011018210-A1 (Year: 2011).*

*Primary Examiner* — Kyle A Cook
(74) *Attorney, Agent, or Firm* — Corinne R. Gorski

(57) ABSTRACT

A thread milling tool includes a tool body with at least one pair of insert seats including of a first insert seat and a second insert seat, which are angularly and axially offset from each other, and several double-sided thread milling inserts. Each thread milling inserts is adapted to the first and second insert seats such that it is mountable in the first insert seat in one single working position with a first group of cutting edges on a first side of the thread milling insert in an active cutting position, and mountable in the second insert seat in one single working position with a second group of cutting edges on an opposite second side of the thread milling insert in an active cutting position. A thread milling insert suitable for use in such a thread milling tool is also provided.

9 Claims, 10 Drawing Sheets

(56) References Cited

U.S. PATENT DOCUMENTS

| | | | | |
|---|---|---|---|---|
| 2006/0045633 | A1* | 3/2006 | Morgulis | B23G 5/18 407/113 |
| 2008/0044239 | A1* | 2/2008 | Sjoo | B23C 5/2493 407/36 |
| 2009/0169312 | A1* | 7/2009 | Sjoo | B23F 21/163 408/233 |
| 2012/0045288 | A1* | 2/2012 | Morgulis | B23G 5/18 407/120 |
| 2020/0230726 | A1* | 7/2020 | Shiroma | B23C 5/2213 |

FOREIGN PATENT DOCUMENTS

| | | | | |
|---|---|---|---|---|
| WO | 2005080038 | A1 | 9/2005 | |
| WO | 2010101512 | A2 | 9/2010 | |
| WO | WO-2011018210 | A1 * | 2/2011 | B23G 5/18 |

* cited by examiner

A
40a
40b
5
34
7
10
34
40b
B
B
40a
30
A
10
30
40a
40b
34
34
40b
40a 30
34
2
10b
31a
11
8a
8a
10a
31b
41
31
13

17
46a
47
10
42
43
42
46b
30
31b
34
23
8a
8a
27
20b
21
31a
20a
2
41
20

42
43
42
17
46a
46b

5
C
34
40b
40a
D
40b
40a
34
40a
10
D
10
30
40a
30
C
40a
34
30
40b
34
40b
30
10
40b
40b
34
34
40a
40a 2
10b
31a
34
30
10a
31b
41
11
8a
8a
31
13
46a
47
10
42
43
42
46b 20b
31b
34
8a
8a
23
30
27
21
31a
20a
2
41
20
46b
42
43
42
46a
47

THREAD MILLING TOOL AND THREAD MILLING INSERT

RELATED APPLICATION DATA

This application is a § 371 National Stage Application of PCT International Application No. PCT/EP2021/082402 filed Nov. 22, 2021 with priority to EP 202111239.7 filed Dec. 2, 2020.

FIELD OF THE INVENTION AND PRIOR ART

The present invention relates to a thread milling tool. The invention also relates to a thread milling insert intended for use in such a thread milling tool.

A thread milling tool is a rotating cutting tool used for cutting threads in a workpiece. A thread milling tool may be provided with one or more cutting inserts detachably mounted in a respective insert seat in a tool body of the thread milling tool. These cutting inserts are in the following referred to as thread milling inserts. A thread milling insert is normally provided with a plurality of teeth arranged one after the other in a row along a peripheral side of the thread milling insert, wherein the cutting edges of the thread milling insert are formed on these teeth. Each thread milling insert is with advantage double-sided in order to increase the useful life thereof, wherein each tooth has a first cutting edge on a first side of the tooth and a corresponding second cutting edge on an opposite second side of the tooth.

A thread milling tool with double-sided thread milling inserts is previously known from EP 1 198 321 B1. When the cutting edges on one side of the teeth of a thread milling insert included in the thread milling tool according to EP 1 198 321 B1 has been worn out, the thread milling insert may be repositioned in its insert seat and mounted in a new inverted working position with the cutting edges on the other side of the teeth in an active cutting position.

In the thread milling tool disclosed in EP 1 198 321 B1, all the insert seats have the same axial position in the tool body and extend alongside of each other, wherein each one of the thread milling inserts has a large number of teeth that cover the entire cutting profile of the thread milling tool, as seen in the longitudinal direction of the tool body. Thus, in this case, each individual thread milling insert has a rather long extension as seen in the longitudinal direction of the tool body. However, a thread milling tool with detachable thread milling inserts may as an alternative be provided with insert seats that are axially offset from each other in the longitudinal direction of the tool body and consequently located at mutually different axial positions in the tool body. In the latter case, the cutting profile of the thread milling tool is divided into separate parts, as seen in the longitudinal direction of the tool body, with a first part of the cutting profile formed by cutting edges on the teeth of a number of first thread milling inserts located in a corresponding number of first insert seats located close to a front end of the tool body and with a second part of the cutting profile formed by cutting edges on the teeth of a number of second thread milling inserts located in a corresponding number of second insert seats located further away from the front end of the tool body. By dividing the thread milling inserts into shorter inserts that are axially offset from each other, the length of the individual thread milling inserts may be reduced and a more favourable distribution of the thread milling inserts about the longitudinal axis of the tool body may be achieved, which in its turn makes it possible to reduce the vibrations induced in the tool body by the cutting forces acting on the thread milling inserts during a thread milling operation. A thread milling tool of the last-mentioned type is for instance disclosed in WO 2010/101512 A2.

OBJECT OF THE INVENTION

The object of the present invention is to provide a thread milling tool of the above-mentioned type that has a new and favourable design.

SUMMARY OF THE INVENTION

The thread milling tool according to the invention comprises:

- an elongated tool body having a front end and an opposite rear end, the rear end being configured for attachment to a machine, for instance in the form of a milling machine or a drilling machine, wherein a longitudinal axis of the tool body extends between the rear end and the front end of the tool body;
- at least one pair of insert seats provided in the tool body and consisting of a first insert seat and a second insert seat, the first and second inserts seats being angularly offset from each other with respect to the longitudinal axis of the tool body and axially offset from each other in the longitudinal direction of the tool body with the first insert seat located closer to the front end of the tool body than the second insert seat, wherein each one of the first and second insert seats has a first end and an opposite second end, the first end of each one of the first and second insert seats being arranged closer to the front end of the tool body than the opposite second end of the same insert seat; and
- several substantially geometrically identical thread milling inserts, each of which being detachably mountable in a respective insert seat and comprising:
  - an elongated insert body having a first end and an opposite second end, wherein the insert body comprises first and second major faces arranged on opposite sides of the insert body and serving as top and bottom faces of the thread milling insert, and wherein the insert body is provided with an axial abutment surface, which is located at the first end of the insert body and which is configured to abut against a corresponding axial support surface in the first insert seat when the thread milling insert is mounted in the first insert seat and to abut against a corresponding axial support surface in the second insert seat when the thread milling insert is mounted in the second insert seat, and
  - a plurality of teeth, preferably three or more in number, arranged one after the other in a row along a peripheral side of the insert body that is located between the first and second major faces and that extends between the first and second ends of the insert body, wherein each tooth has a first cutting edge on a first side of the tooth facing the first major face and a second cutting edge on an opposite second side of the tooth facing the second major face, the first cutting edges of the teeth forming a first group of cutting edges and the second cutting edges of the teeth forming a second group of cutting edges, wherein the first group of cutting edges and the second group of cutting edges are mirror symmetrical to each other with respect to a median plane of the insert body that extends halfway between the first and second major faces of the insert body.

The above-mentioned mirror symmetry of the first and second groups of cutting edges implies that each thread milling insert has the form of a double-sided insert with the same cutting edge profile formed on both sides of the teeth on the insert body of the thread milling insert, wherein the distance between the axial abutment surface on the thread milling insert and the proximate end of the cutting edge profile formed by the first group of cutting edges is equal, within manufacturing tolerances, to the distance between the axial abutment surface and the proximate end of the other cutting edge profile formed by the second group of cutting edges.

The axial support surfaces in the first and second insert seats of said at least one pair of insert seats are arranged in one of the following to alternative manners:

A) with the axial support surface in the first insert seat located at the second end of the first insert seat and facing the front end of the tool body, and the axial support surface in the second insert seat located at the first end of the second insert seat and facing the rear end of the tool body; or B) with the axial support surface in the first insert seat located at the first end of the first insert seat and facing the rear end of the tool body, and the axial support surface in the second insert seat located at the second end of the second insert seat and facing the front end of the tool body.

Furthermore, the thread milling inserts are adapted to the first and second insert seats of said at least one pair of insert seats in such a manner that each one of the thread milling inserts is:

mountable in the first insert seat in one single working position with the axial abutment surface on the insert body of the thread milling insert abutting against the axial support surface in the first insert seat and with one of said first and second groups of cutting edges in an active cutting position, i.e. in operative position, and mountable in the second insert seat in one single working position with the axial abutment surface on the insert body of the thread milling insert abutting against the axial support surface in the second insert seat and with the other one of said first and second groups of cutting edges in an active cutting position.

Thus, the thread milling inserts have the form of double-sided inserts and each one of them is mountable to the tool body in two different working positions. However, in contrast to double-sided thread milling inserts of conventional type, the double-sided thread milling inserts included in the thread milling tool of the present invention are each provided with one single axial abutment surface, which is used for defining the axial position of the thread milling insert in the tool body in both of the two possible working positions of the thread milling insert. When the cutting edges on one side of the teeth of a thread milling insert included in the thread milling tool of the present invention has been worn out, the thread milling insert cannot be repositioned and mounted in a new inverted working position in the same insert seat. On the contrary, in order to bring the cutting edges on the other side of the teeth into an active cutting position, the thread milling insert has to be moved from its present insert seat to another insert seat that has another axial position in the tool body than the present insert seat. An incorrect mounting of an individual thread milling insert is hereby prevented in an efficient and simple manner, which in its turn implies that the operation for repositioning of the thread milling inserts may be effected quickly and easily.

According to the invention, one and the same surface on a thread milling insert is used as axial abutment surface in both working positions of the thread milling insert, i.e. when the thread milling insert is mounted in an insert seat with the first group of cutting edges in operative position and also when the thread milling insert is mounted in another insert seat with the second group of cutting edges in operative position. This implies that the surface in question, i.e. the surface used as axial abutment surface, can be used as an axial reference plane during the grinding of the first group of cutting edges on the first side of the teeth on the thread milling insert and also during the grinding of the second group of cutting edges on the opposite second side of the teeth, which is favourable with respect to the tolerances of the thread milling insert. The first group of cutting edges on the first side of the teeth on the thread milling insert and the second group of cutting edges on the opposite second side of the teeth may also be grinded at the same time, in one grinding operation, with the same axial abutment surface as axial reference plane. The surface on the insert body opposite to the axial abutment surface does not need to be grinded because it does not constitute an axial abutment surface. Due to that, a tolerance of a distance between the axial abutment surface and the surface opposite to the axial abutment surface does not give a contribution to a total tolerance of the tool when the inserts are mounted in the tool body. With this design of the thread milling inserts, the tolerances of a thread milling tool provided with these shorter thread milling inserts mounted at two different axial positions in the tool body are not deteriorated as compared to a corresponding thread milling tool provided with longer thread milling inserts where the teeth on each individual thread milling insert cover the entire cutting profile of the thread milling tool, as seen in the longitudinal direction of the tool body.

The insert body of each thread milling insert preferably also comprises a radial abutment surface, which is formed on a peripheral side of the insert body opposite to the peripheral side provided with the teeth and which is configured to abut against a corresponding radial support surface in any of the first and second insert seats when the thread milling insert is mounted in the insert seat in question.

According to an embodiment of the invention, the insert body of each one of the thread milling inserts has:

mirror symmetry with respect to the median plane of the insert body, mirror asymmetry with respect to any other plane across the insert body, and rotational asymmetry with respect to any axis across the insert body.

With such a design of the thread milling inserts, the shape of the first and second insert seats may easily be adapted to the shape of the thread milling inserts in such a manner that each thread milling insert is mountable only in a first working position in any of the first insert seats located close to the front end of the tool body and only in an inverted second working position in any of the second insert seats located further away from the front end of the tool body. In this context, the insert body is considered to have mirror symmetry with respect to its median plane even if any of the surfaces of the insert body is provided with one or more minor markings, for instance in the form of recesses, that lack a mirror-symmetry image with respect to the median plane of the insert body, on condition that these one or more markings have no relevance for the functioning of the thread milling insert. Furthermore, with such a design of the thread milling inserts, the first seat and the second seat may be given the same or at least partly same design which simplifies the designing process of the tool body.

The shape of the insert body of each one of the thread milling inserts is preferably so adapted to the shape of the first and second insert seats that the insert body fits into the first insert seat, i.e. may be mounted in the first insert seat, only in a position with the axial abutment surface on the insert body abutting against the axial support surface in the first insert seat and fits into the second insert seat, i.e. may be mounted in the second insert seat, only in a position with the axial abutment surface on the insert body abutting against the axial support surface in the second insert seat. This may for instance be achieved by giving the insert body of each one of the thread milling inserts such a design that an end section at the first end of the insert body has a shape that differs from the shape of a corresponding end section at the opposite second end of the insert body. Hereby, a mounting of a thread milling insert in an incorrect position in any of the insert seats may be prevented in a simple and efficient manner. This may also be achieved by giving the insert body of each one of the thread milling inserts such a design that the insert body comprises a fastening means for fastening of the thread milling insert in any of the first and second insert seats, which fastening means is arranged at different positions in relation to the first end and the second end of the insert body.

The insert body of each one of the thread milling inserts may be provided with:

- a radial abutment surface, which is formed on a peripheral side of the insert body opposite to the peripheral side provided with the above-mentioned teeth and which is configured to abut against a corresponding radial support surface in any of the first and second insert seats when the thread milling insert is mounted in the insert seat in question; and
- an inclined peripheral side surface, which inclined peripheral side surface forms a connection between the radial abutment surface and either the first end of the insert body or the second end of the insert body, and which inclined peripheral side surface is configured to face a corresponding inclined surface in any of the first and second insert seats when the thread milling insert is mounted in the insert seat in question.

By adapting an inclined peripheral side surface on the insert body of each thread milling insert to an inclined surface in the insert seats, it will be possible to ensure that each thread milling insert only fits into any of the insert seats in one single predetermined position with the inclined peripheral side surface on the insert body facing the corresponding inclined surface in the insert seat. As an alternative to the bevelled shape of the insert body formed by said inclined peripheral side surface and the matching bevelled shape of the insert seats formed by the corresponding inclined surfaces in the insert seats, the insert body and the insert seats may also have any other suitable and mutually matching shapes.

According to another embodiment of the invention, the axial abutment surface on the insert body of each one of the thread milling inserts is formed by an end surface on the insert body at the first end thereof. In this case, the first insert seats may be open towards a front end surface of the tool body, i.e. with the first end of each first insert seat formed as an opening in said front end surface, or with a small material portion between the front end surface of the tool body and the first end of each first insert seat. In both cases, the tool is adapted for machining of threads closer to a bottom of the hole in the work piece and is better adapted for machining where fixturing of the work piece is demanding. In this case, the insert body of each one of the thread milling inserts may be provided with:

- a radial abutment surface, which is formed on a peripheral side of the insert body opposite to the peripheral side provided with the above-mentioned teeth and which is configured to abut against a corresponding radial support surface in any of the first and second insert seats when the thread milling insert is mounted in the insert seat in question; and
- an inclined peripheral side surface, which forms a connection between the axial and radial abutment surfaces on the insert body and which is configured to face a corresponding inclined surface in any of the first and second insert seats when the thread milling insert is mounted in the insert seat in question.

By adapting an inclined peripheral side surface at the first end of the insert body of each thread milling insert to an inclined surface in the insert seats, it will be possible to ensure that each thread milling insert only fits into any of the insert seats in one single predetermined position with the inclined peripheral side surface on the insert body facing the corresponding inclined surface in the insert seat. Said inclined surface in the insert seats will be located at that end of each insert seat where the axial support surface of the insert seat is arranged and this end of the insert seat will consequently occupy less space in the tool body as compared to an insert seat of a corresponding size where the depth of the insert seat is constant along the entire length of the insert seat, which in its turn will result in an increased strength of the part or parts of the tool body where the first ends of the thread milling inserts are received. This strengthening of the tool body is of particular importance if the axial support surfaces in the first and second insert seats are arranged in accordance with the above-mentioned alternative A and an area at the first end of each second insert seat overlaps an area at the second end of each first insert seat, as seen in the longitudinal direction of the tool body.

As an alternative to the bevelled shapes of the first end section of the insert body and the matching end sections of the insert seats described above, these end sections may also have any other suitable and mutually matching shapes.

The first and second insert seats of said at least one pair of insert seats may have such axial positions in relation to each other in the tool body that the axial distance between the tooth closest to the second end of the first insert seat on a thread milling insert mounted in the first insert seat and the tooth closest to the first end of the second insert seat on a thread milling insert mounted in the second insert seat is substantially equal to the axial distance between two adjacent teeth on any of these thread milling inserts. However, the first and second insert seats of said at least one pair of insert seats may as an alternative have such axial positions in relation to each other in the tool body that the tooth closest to the second end of the first insert seat on a thread milling insert mounted in the first insert seat and the tooth closest to the first end of the second insert seat on a thread milling insert mounted in the second insert seat are located at the same axial position in the tool body and thereby overlap each other in the longitudinal direction of the tool body.

According to another embodiment of the invention, two or more such pairs of insert seats are provided in the tool body, wherein the first insert seats of the different pairs of insert seats are located at the same axial position in the tool body and are evenly distributed about the longitudinal axis of the tool body, and wherein the second insert seats of the different pairs of insert seats are located at the same axial position in the tool body and are evenly distributed about the longitudinal axis of the tool body.

Further advantageous features of the thread milling tool according to the present invention will appear from the description following below.

The invention also relates to a thread milling insert intended for use in a thread milling tool of the above-mentioned type.

The thread milling insert according to the invention comprises:

an elongated insert body having a first end and an opposite second end, wherein the insert body comprises first and second major faces arranged on opposite sides of the insert body and serving as top and bottom faces of the thread milling insert, and wherein the insert body is provided with an axial abutment surface, which is located at the first end of the insert body and which is configured to abut against a corresponding axial support surface in an insert seat in the thread milling tool when the thread milling insert is mounted in the insert seat; and a plurality of teeth arranged one after the other in a row along a peripheral side of the insert body that is located between the first and second major faces and that extends between the first and second ends of the insert body, each tooth having a first cutting edge on a first side of the tooth facing the first major face and a second cutting edge on an opposite second side of the tooth facing the second major face, wherein the first and second cutting edges on each tooth are mirror symmetrical to each other with respect to a median plane of the insert body that extends halfway between the first and second major faces of the insert body.

The insert body has:

mirror symmetry with respect to the median plane of the insert body, mirror asymmetry with respect to any other plane across the insert body, and rotational asymmetry with respect to any axis across the insert body.

The above-mentioned mirror symmetry of the cutting edges and the insert body implies that the thread milling insert has the form of a double-sided insert with the same cutting edge profile formed on both sides of the teeth on the insert body, wherein the distance between the axial abutment surface and the proximate end of the cutting edge profile on a first side of the teeth is equal, within manufacturing tolerances, to the distance between the abutment surface and the proximate end of the other cutting edge profile on the opposite second side of the teeth. Furthermore, the above-mentioned mirror asymmetry and rotational asymmetry of the insert body implies that the insert seats of a thread milling tool easily may be adapted to the shape of the insert body in such a manner that the thread milling insert is mountable in one single predetermined working position in each insert seat. Thus, a thread milling insert having an insert body of this design is suitable for use in a thread milling tool of the type described above. In this context, the insert body is considered to have mirror symmetry with respect to its median plane even if any of the surfaces of the insert body is provided with one or more minor markings, for instance in the form of recesses, that lack a mirror-symmetry image with respect to the median plane of the insert body, on condition that these one or more markings have no relevance for the functioning of the thread milling insert.

Further advantageous features of the thread milling insert according to the present invention will appear from the dependent claims and the description following below.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

Figure 1:
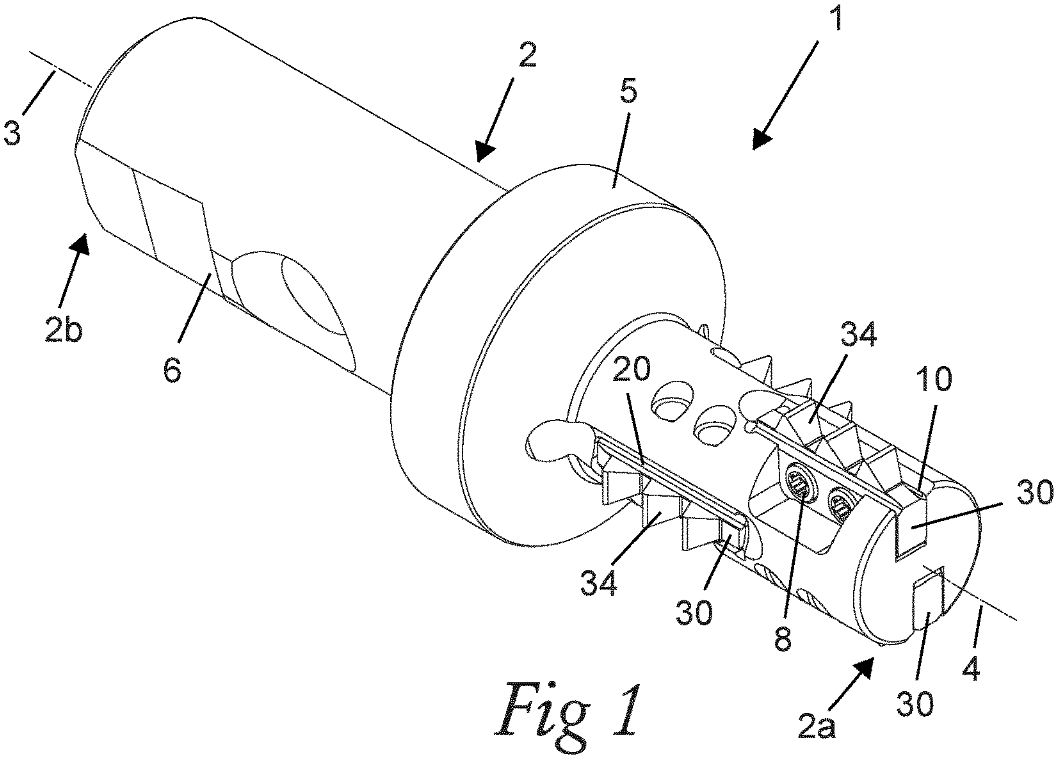
FIGS. 1 and 2 are perspective views of a thread milling tool according to a first embodiment of the present invention.
Figure 2:
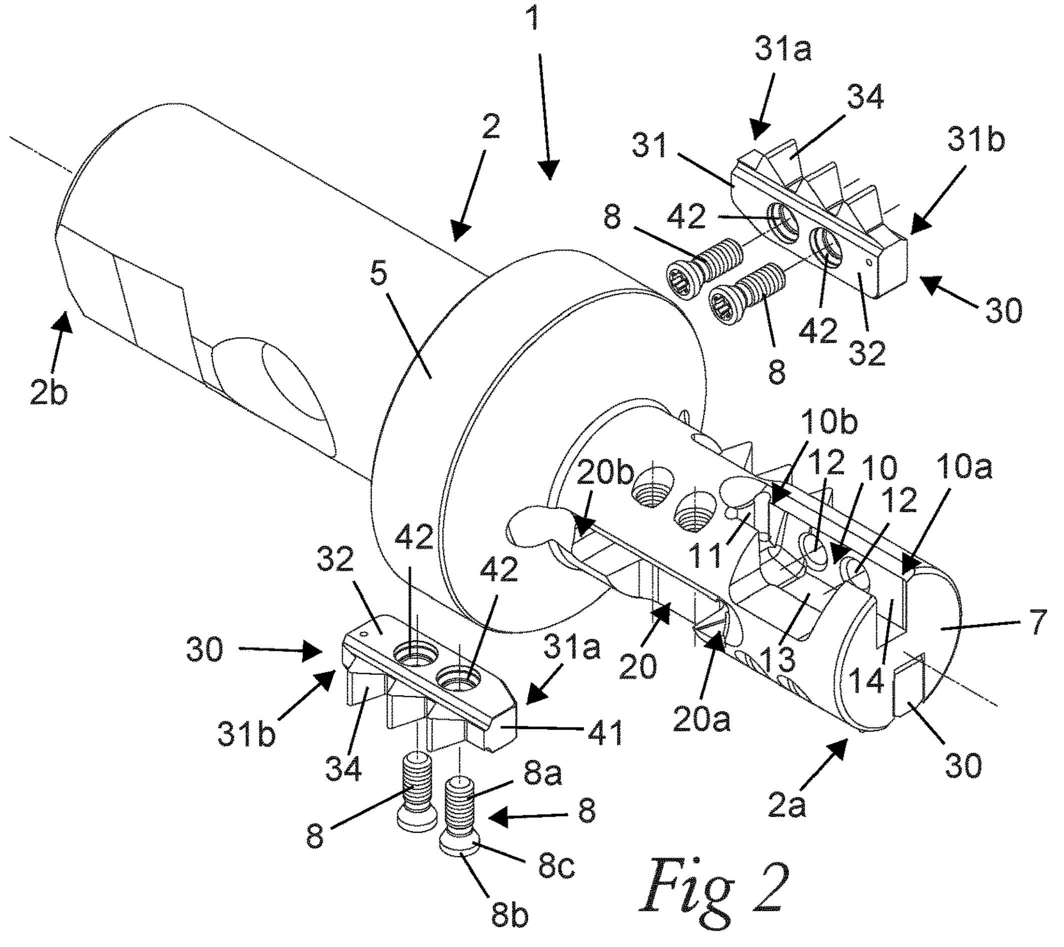
Figure 3:
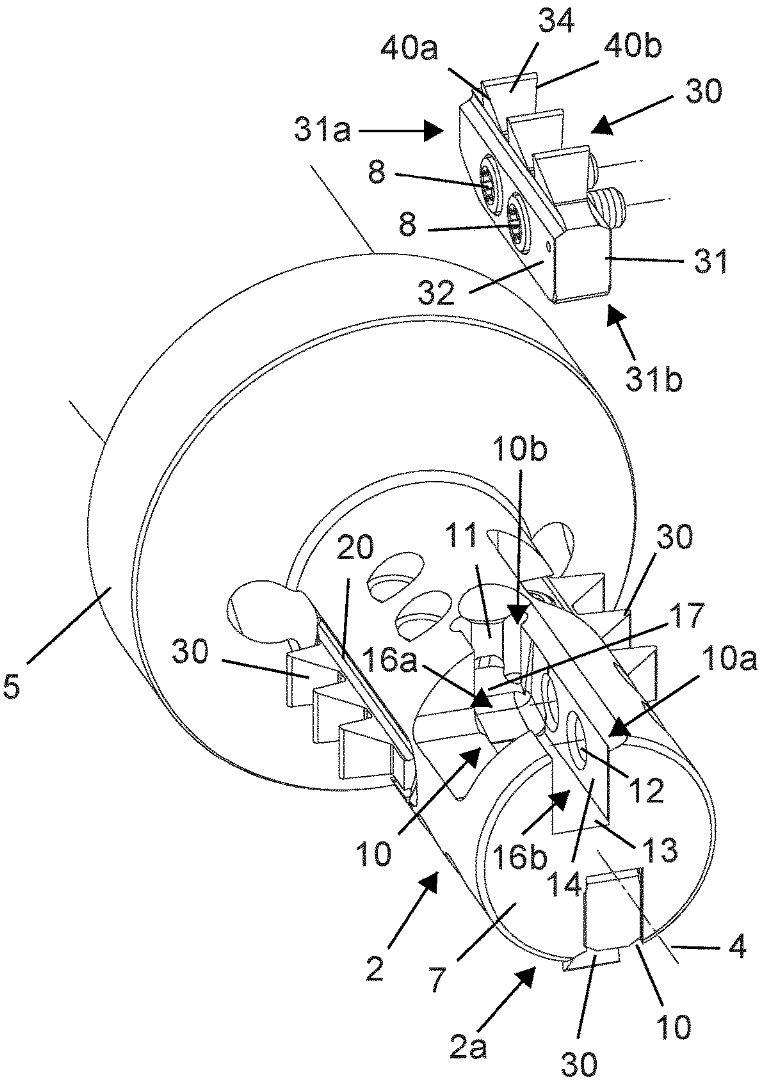
FIGS. 3 and 4 are perspective views from different directions of a part of the thread milling tool of FIGS. 1 and 2.
Figure 4:
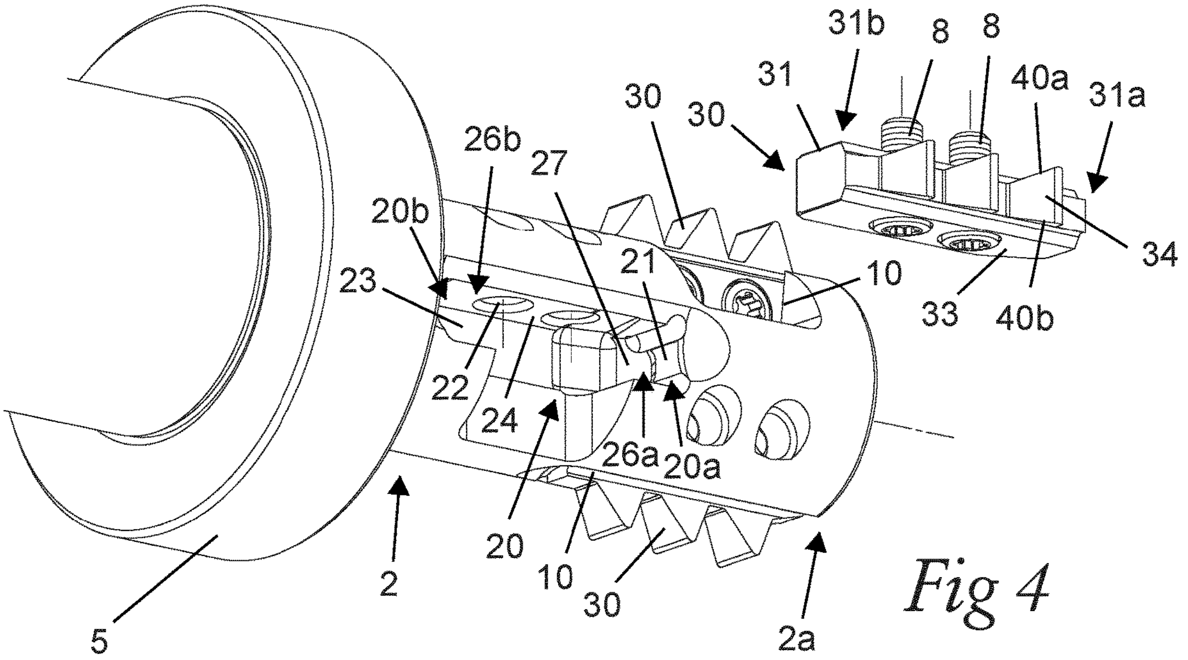
Figure 5:
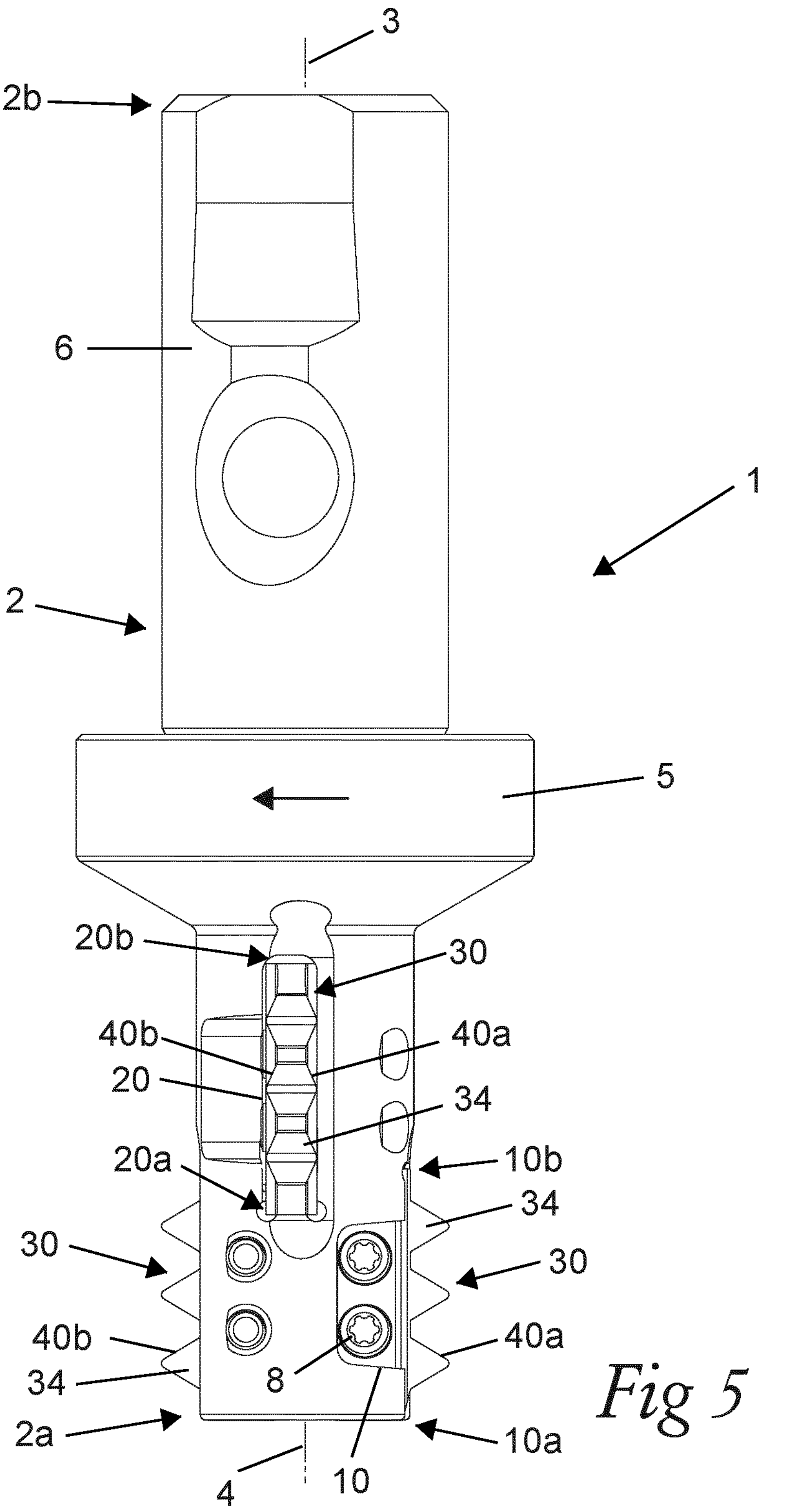
FIG. 5 is a lateral view of the thread milling tool of FIGS. 1 and 2.
Figure 6:
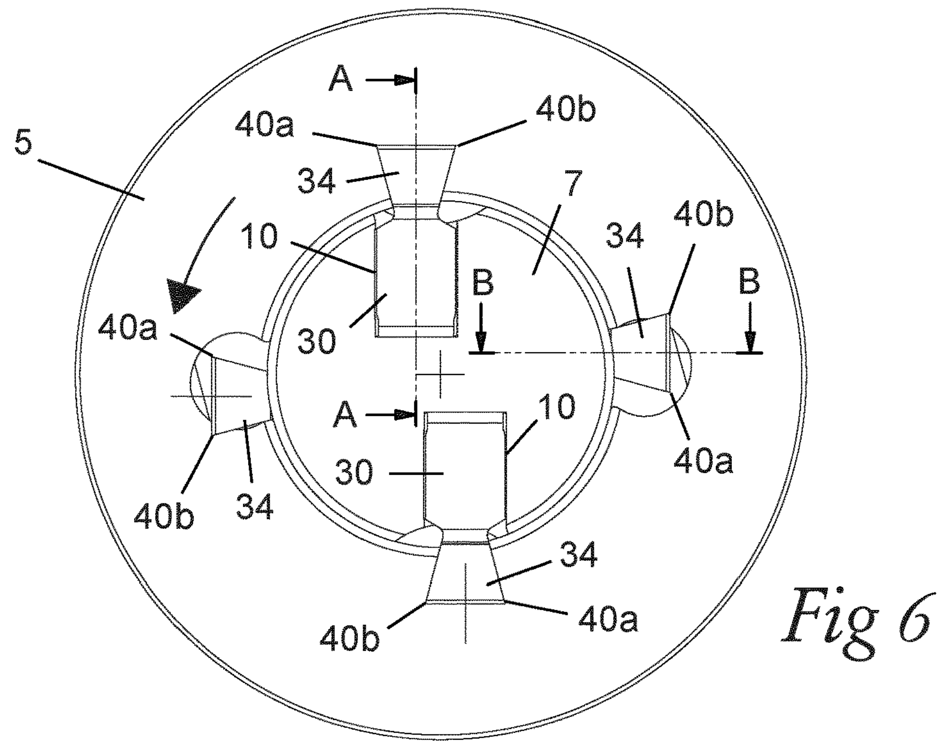
FIG. 6 is a front view of the thread milling tool of FIGS. 1 and 2.
Figure 7:
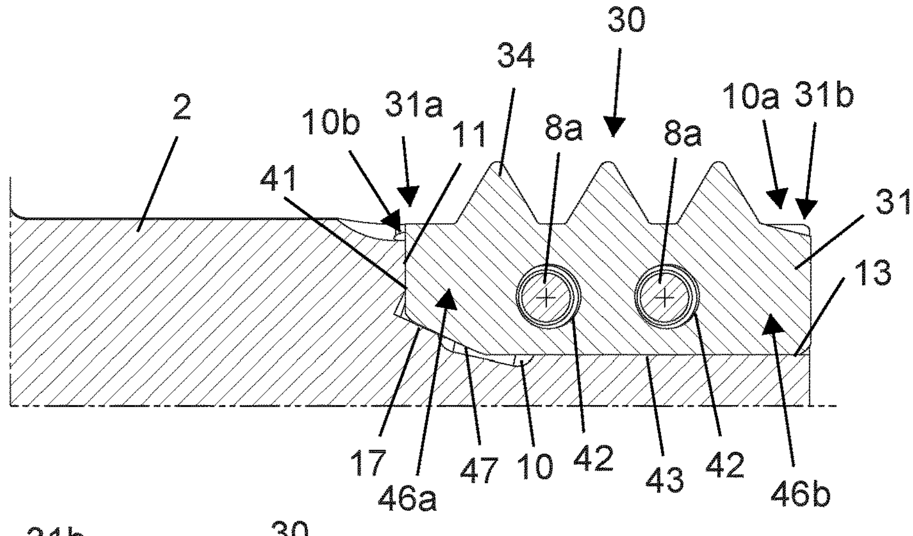
FIG. 7 is a cut according to the line A-A in FIG. 6.
Figure 8:
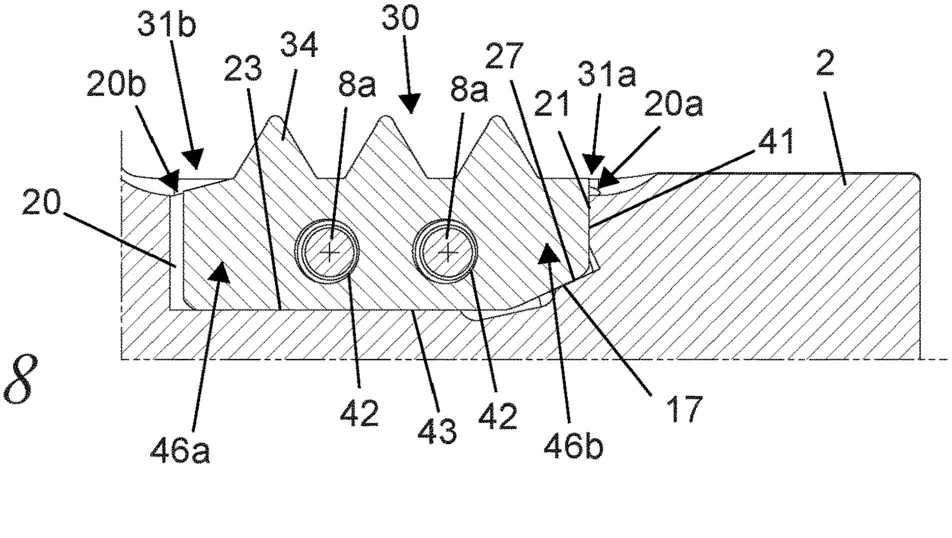
FIG. 8 is a cut according to the line B-B in FIG. 6, FIGS. 9*a* and 9*b* are perspective views from different directions of a thread milling insert included in the thread milling tool of FIGS. 1 and 2.
Figure 9A:
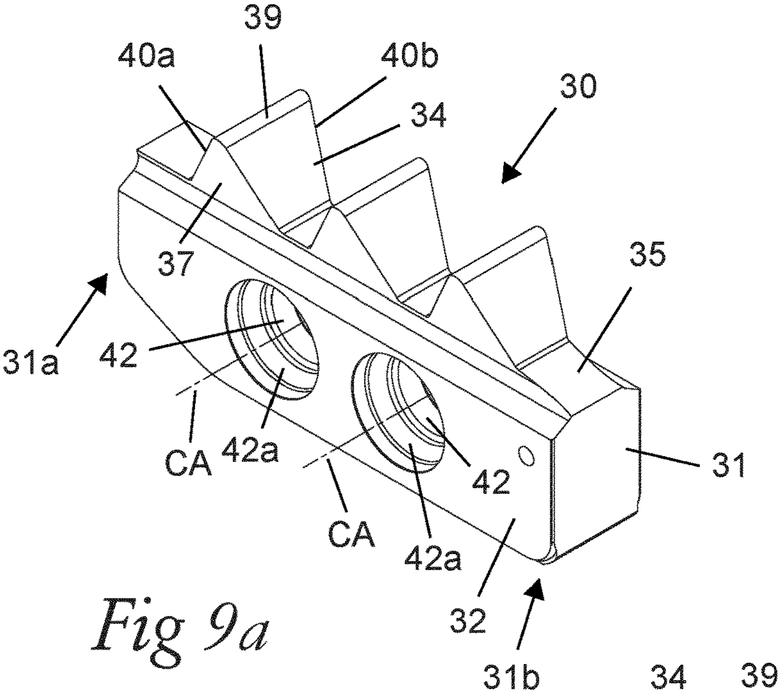
Figure 9B:
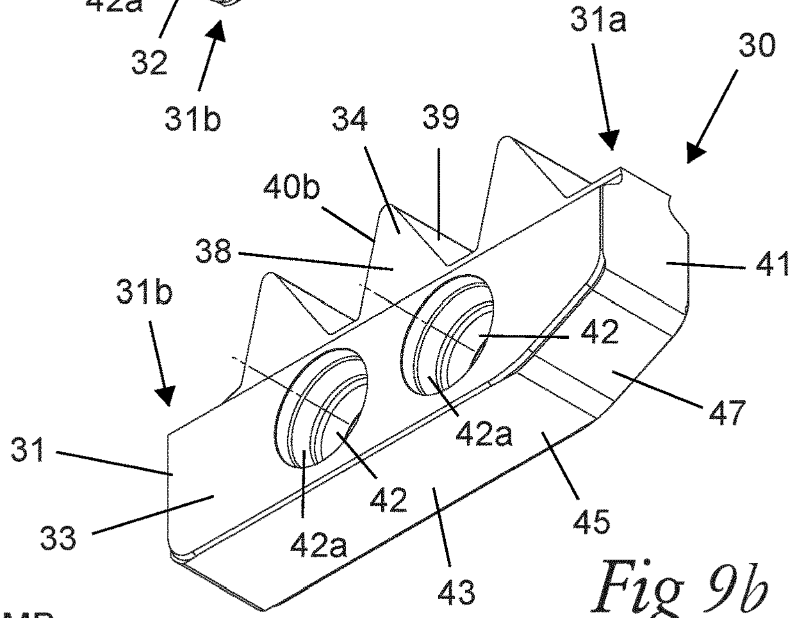

Two different embodiments of a thread milling tool 1 according to the present invention are illustrated in FIGS. 1-8 and 11-18. The thread milling tool 1 comprises an elongated tool body 2 and is configured to be rotated about an axis of rotation 3. The tool body 2 has a front end 2*a* and an opposite rear end 2*b*. A longitudinal axis 4 of the tool body 2 extends between the rear end 2*b* and the front end 2*a* of the tool body, wherein this longitudinal axis 4 coincides with the axis of rotation 3 of the thread milling tool 1. In the illustrated embodiments, a collar 5 is provided at the middle of the tool body 2. A rear part of the tool body located between the collar 5 and the rear end 2*b* forms a connection member 6, through which the tool body 2 is mountable, directly or via an intermediate tool holder, to a rotating spindle or the similar of a machine, for instance a milling machine or a drilling machine. A front part of the tool body 2 located between the collar 5 and the front end 2*a* is provided with insert seats 10, 20 configured to receive thread milling insert 30. The insert seats 10, 20 are arranged in pairs, wherein each pair consists of a first insert seat 10 located close to the front end 2*a* of the tool body 2 and a second insert seat 20 located further away from the front end 2*a* of the tool body 2. Thus, the first and second insert seats 10, 20 are axially offset from each other in the longitudinal direction of the tool body 2 with the first insert seat 10 located closer to the front end 2*a* of the tool body 2 than the second insert seat 20. Furthermore, the first and second insert seats 10, 20 are angularly offset from each other with respect to the longitudinal axis 4 of the tool body 2. The first insert seat 10 extends in the longitudinal direction of the tool body 2 and has a first end 10*a* and an opposite second end 10*b*, wherein the first end 10*a* of the first insert seat is located closer to the front end 2*a* of the tool body 2 than the second end 10*b* of the first insert seat. Also the second insert seat 20 extends in the longitudinal direction of the tool body 2 in parallel with the first insert seat 10 and has a first end 20*a* and an opposite second end 20*b*, wherein the first end 20*a* of the second insert seat is located closer to the front end 2*a* of the tool body 2 than the second end 20*b* of the second insert seat.

In the embodiment illustrated in FIGS. 1-8, the tool body 2 is provided with two pairs of insert seats 10, 20 of the above-mentioned type. In the embodiment illustrated in FIGS. 11-18, the tool body 2 is provided with three pairs of insert seats 10, 20 of the above-mentioned type. However, the tool body 2 may as an alternative, inter alia depending on the diameter of the tool body, be provided with any other suitable number of insert seats. A smaller diameter tool body may for instance be provided with only one pair of insert seats 10, 20, whereas a larger diameter tool body may be provided with more than three pairs of insert seats 10, 20. When the tool body 2 is provided with two or more pairs of insert seats, the first insert seats 10 of the different pairs are mutually located at the same axial position in the tool body 2 and are evenly distributed about the longitudinal axis 4 of the tool body. In the corresponding manner, the second insert seats 20 of the different pairs are mutually located at the same axial position in the tool body 2 and are evenly distributed about the longitudinal axis 4 of the tool body. Furthermore, the first and second insert seats 10, 20 are alternately arranged as seen in the circumferential direction of the tool body 2. Thus, when seen in the circumferential direction of the tool body 2, each first insert seat 10 is arranged between two second insert seats 20 and each second insert seat 20 is arranged between two first insert seats.

Each insert seat 10, 20 is configured to receive one thread milling insert 30. The thread milling inserts 30 received in the first and second insert seats 10, 20 are geometrically identical to each other, or at least substantially geometrically identical to each other. Thus, the thread milling inserts 30 included in one and the same thread milling tool 1 all have the same basic shape and are of the same size. The thread milling inserts 30 have the form of double-sided inserts and are detachably mountable in the insert seats 10, 20.

Figure 10:
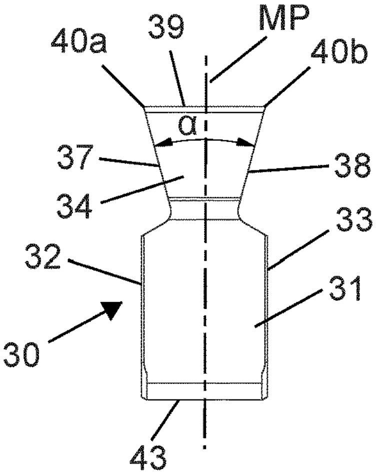
FIG. 10 is a rear view of the thread milling insert of FIGS. 9*a* and 9*b*, FIGS. 11 and 12 are perspective views of a thread milling tool according to a second embodiment of the present invention.
Figure 11:
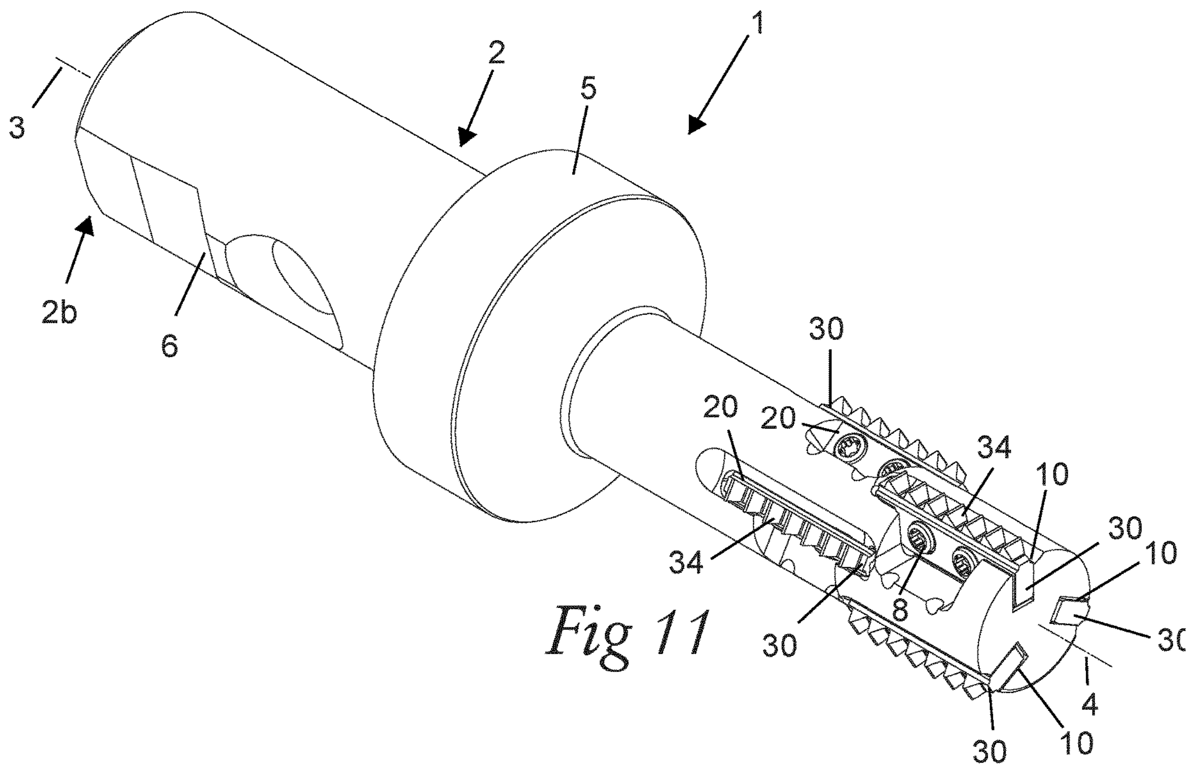
Figure 12:
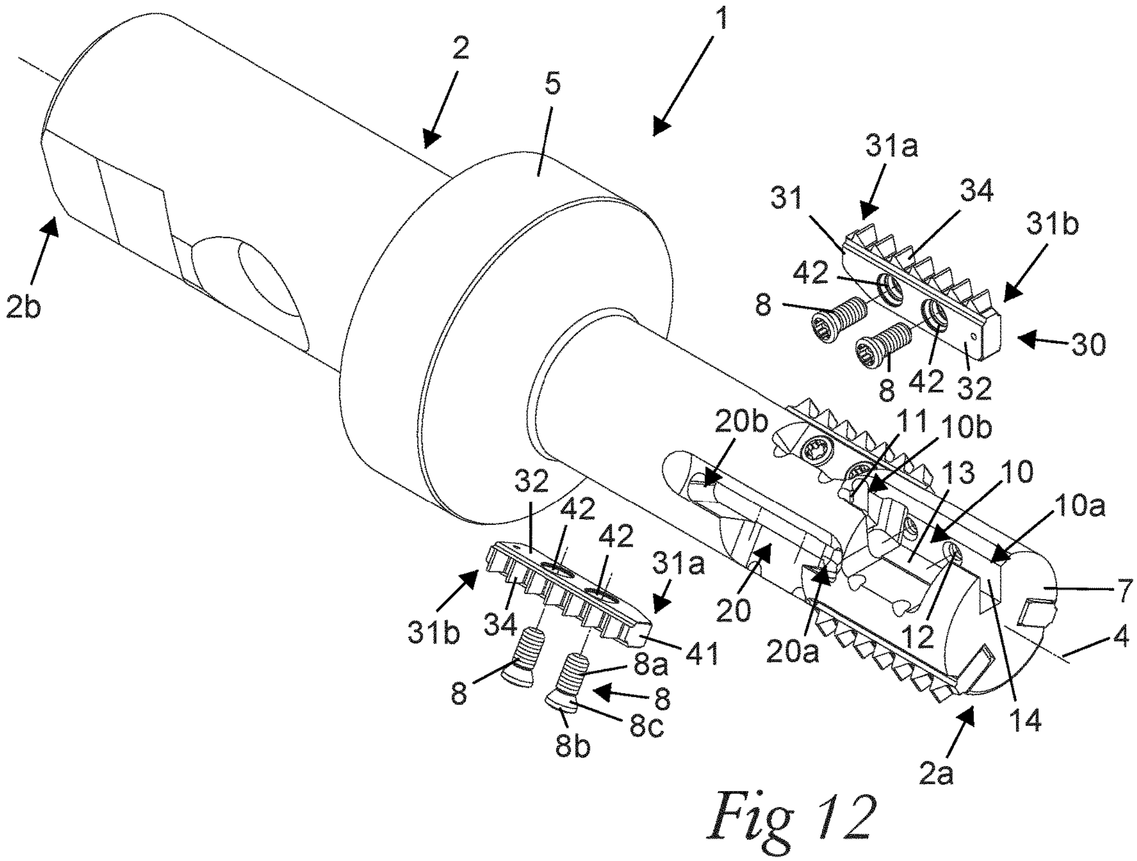
Figure 13:
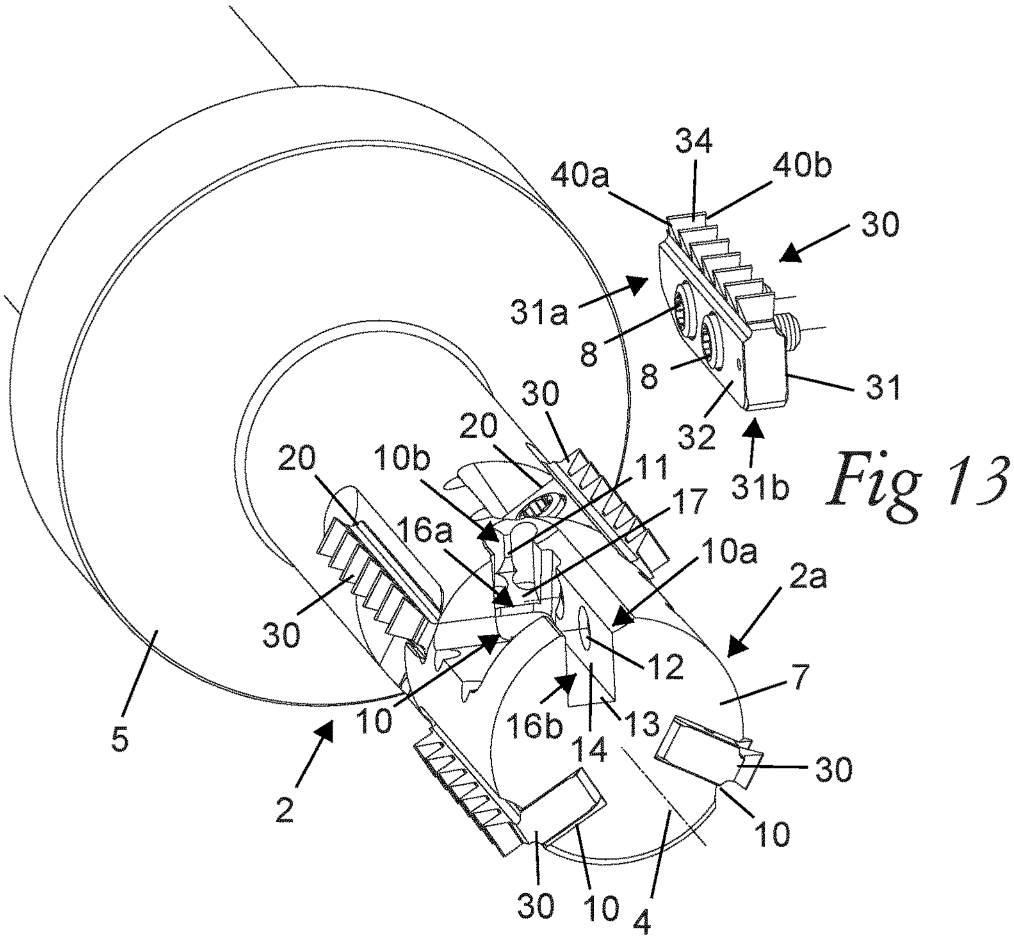
FIGS. 13 and 14 are perspective views from different directions of a part of the thread milling tool of FIGS. 11 and 12.
Figure 14:
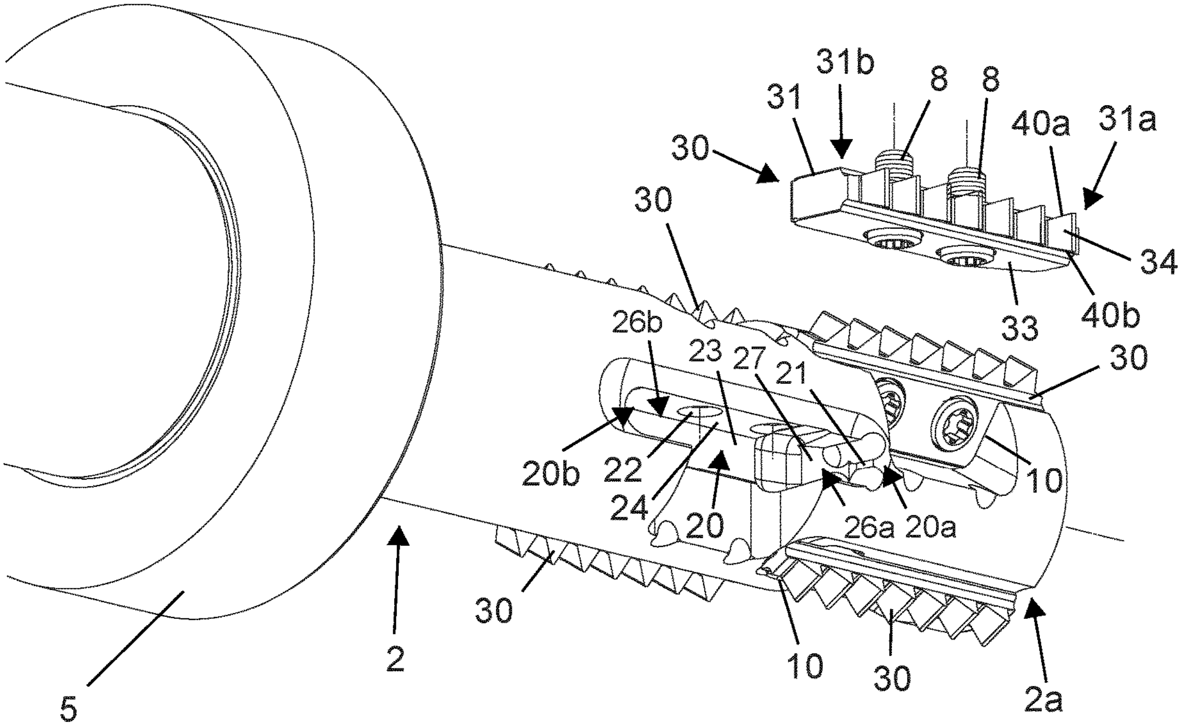
Figure 15:
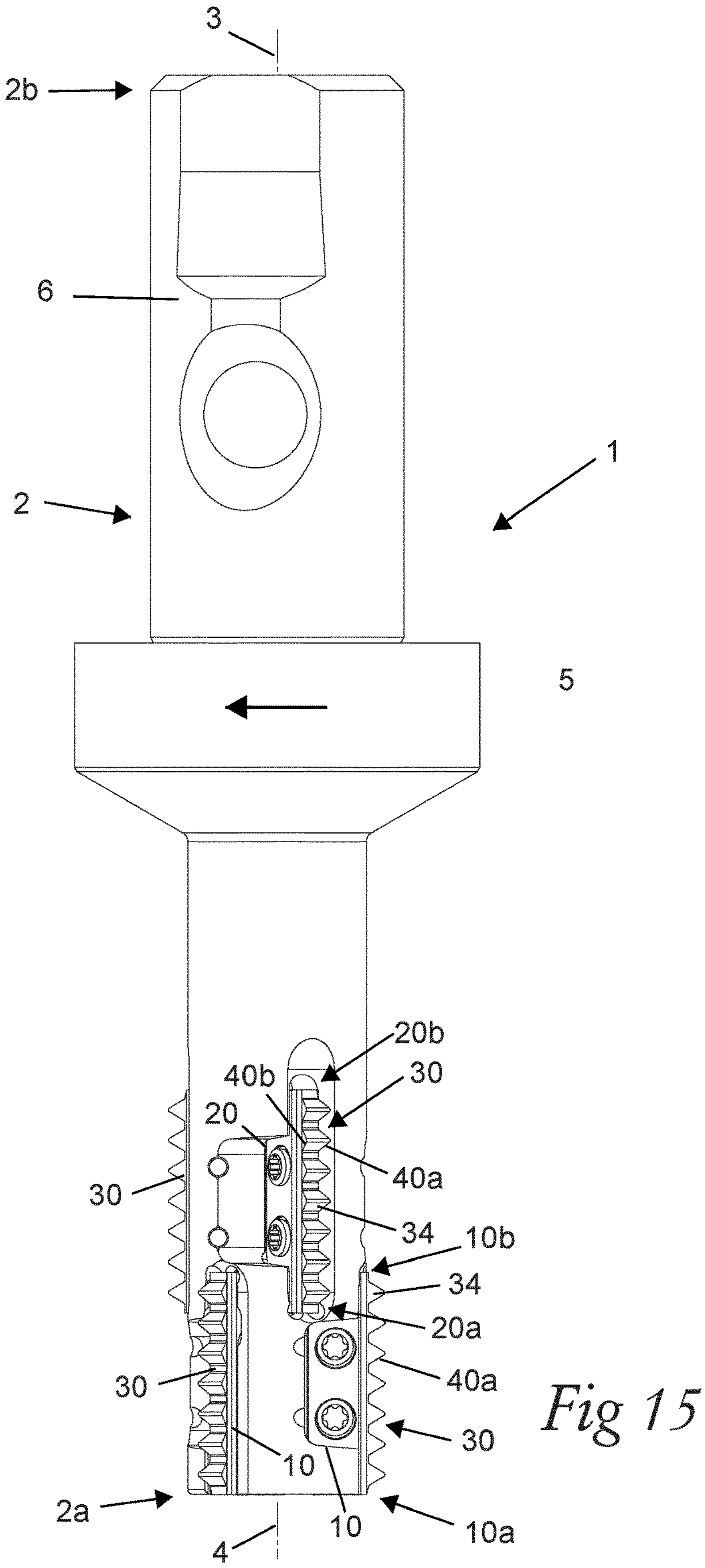
FIG. 15 is a lateral view of the thread milling tool of FIGS. 11 and 12.
Figure 16:
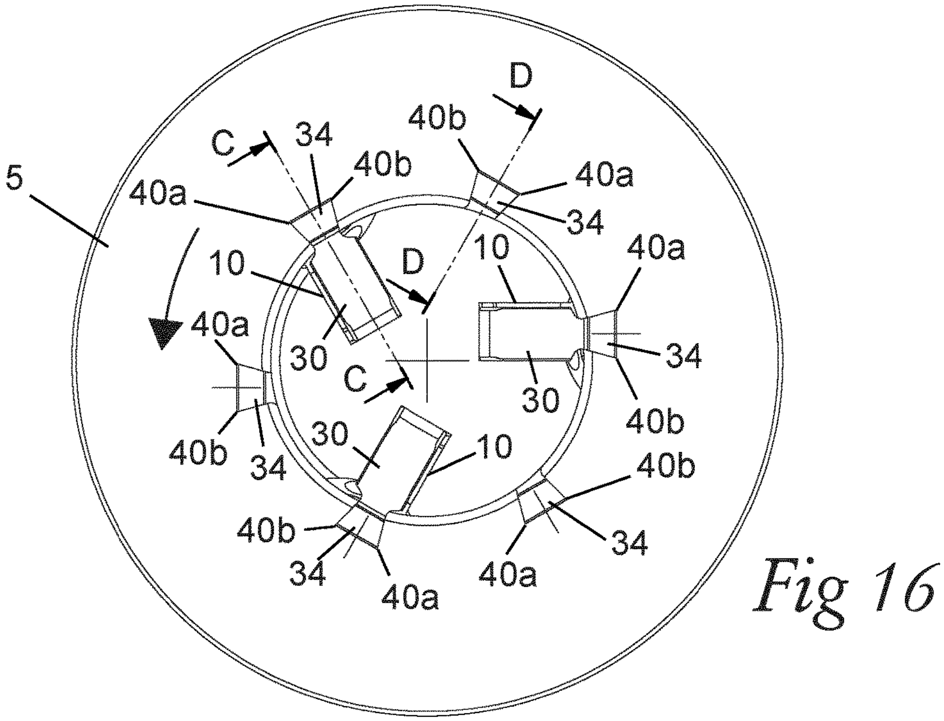
FIG. 16 is a front view of the thread milling tool of FIGS. 11 and 12.
Figure 17:
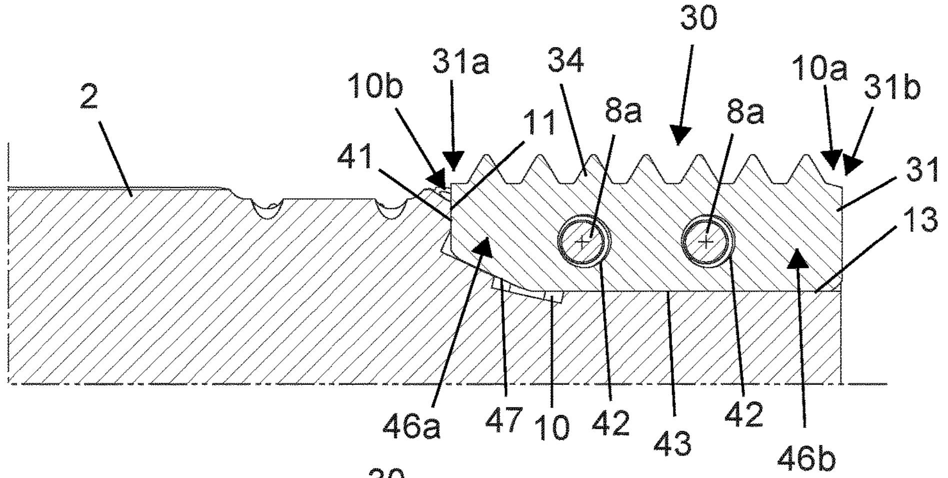
FIG. 17 is a cut according to the line C-C in FIG. 16.
Figure 18:
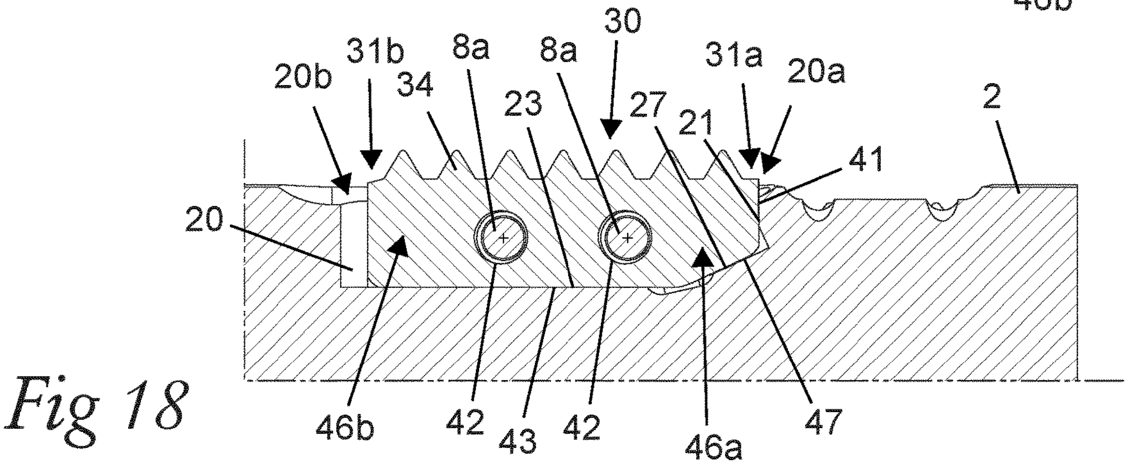
FIG. 18 is a cut according to the line D-D in FIG. 16, FIGS. 19*a* and 19*b* are perspective views from different directions of a thread milling insert included in the thread milling tool of FIGS. 11 and 12.
Figure 19A:
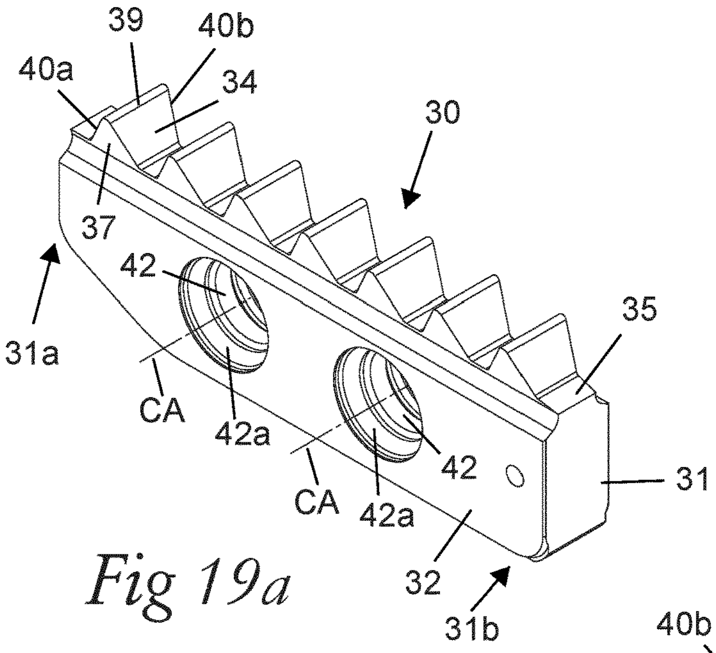
Figure 19B:
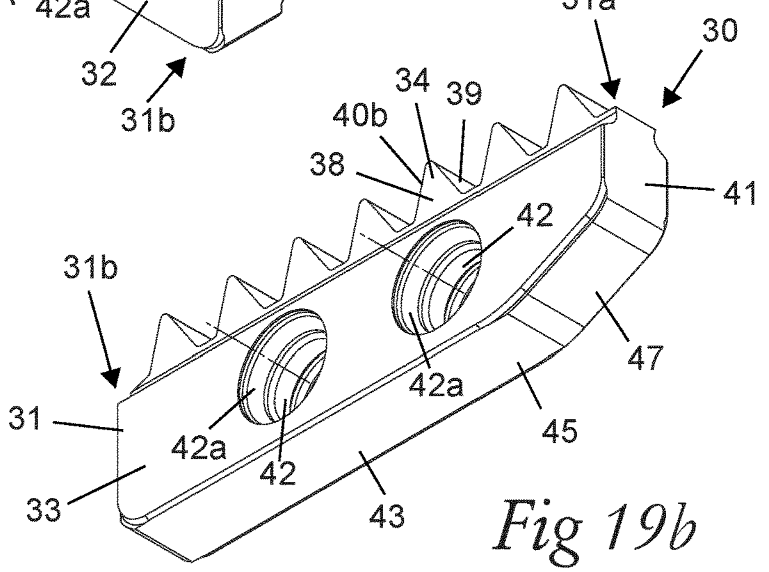
Figure 20:
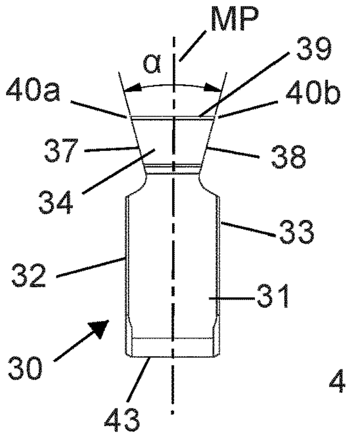
FIG. 20 is a rear view of the thread milling insert of FIGS. 19*a* and 19*b*.

Each thread milling insert 30 comprises an elongated insert body 31 having a first end 31*a* and an opposite second end 31*b*. The insert body 31 comprises first and second major faces 32, 33, which are arranged on opposite sides of the insert body 31 and which serve as top and bottom faces of the thread milling insert 30. The first and second major faces 32, 33 of the insert body 31 extend between the first and second ends 31*a*, 31*b* of the insert body 31. A median plane MP, which constitutes an imaginary plane, extends halfway between the first and second major faces 32, 33 of the insert body 31, as illustrated in FIGS. 10 and 20. Each thread milling insert 30 further comprises a plurality of teeth 34 arranged one after the other in a row along a peripheral side 35 of the insert body 31 that is located between the first and second major faces 32, 33 and that extends between the first and second ends 31*a*, 31*b* of the insert body 31. Each tooth 34 has a first side surface 37, an opposite second side surface 38 and a peripheral surface 39 extending between the first and second side surfaces 37, 38. On each tooth 34, a first cutting edge 40*a* is formed at an intersection between the peripheral surface 39 and the first side surface 37 and a second cutting edge 40*b* is formed at an intersection between the peripheral surface 39 and the second side surface 38. The first cutting edge 40*a* is arranged on a first side of the tooth 34 facing the first major face 32 of the insert body 31 and the second cutting edge 40*b* is arranged on an opposite second side of the tooth 34 facing the second major face 33 of the tool body 31. The first and second cutting edges 40*a*, 40*b* may extend along the entire or substantially the entire line of intersection between the peripheral surface 39 and the first side surface 37 and the second side surface 38, respectively, or at least along a part thereof at the tip of the tooth 34. In the latter case, each one of the first and second cutting edges 40*a*, 40*b* ends at a distance from the base of the tooth 34 on either side of the tip of the tooth. The first side surface 37 is configured to serve as a rake face for the first cutting edge 40*a*, and the second side surface 38 is configured to serve as a rake face for the second cutting edge 40*b*. The peripheral surface 39 serves as a relief surface for the first and second cutting edges 40*a*, 40*b* and extends perpendicularly to the median plane MP, as illustrated in FIGS. 10 and 20.

In the illustrated embodiments, the first and second side surfaces 37, 38 of each tooth 34 are inclined outwards, at an acute angle α to each other, as seen in a direction from the base of the tooth towards the tip thereof, as illustrated in FIGS. 10 and 20.

The first cutting edges 40*a* of the teeth 34 on each individual thread milling insert 30 form a first group of cutting edges of the thread milling insert and the second cutting edges 40*b* of the teeth 34 form a second group of cutting edges of the thread milling insert. The first group of cutting edges 40*a* and the second group of cutting edges 40*b* are mirror symmetrical to each other with respect to the median plane MP of the insert body 31.

Each thread milling insert 31 is provided with three teeth 34 in the embodiment illustrated in FIGS. 1-10 and with seven teeth 34 in the embodiment illustrated in FIGS. 11-20. However, the thread milling inserts 31 may be provided with any other suitable number of teeth 34.

In the illustrated embodiments, the insert body 31 of each thread milling insert 30 is provided with a fastening means in the form of two through holes 42, which extend in parallel with each other through the insert body 31 between the first and second major faces 32, 33. Each through hole 42 has a centre axis CA that extends perpendicularly to the first and second major faces 32, 33. Each through hole 42 is configured to receive a fastening element 8, for instance in the form of a screw, by means of which the thread milling insert 30 may be releasably fixed in any of the insert seats 10, 20 in the tool body 2. As an alternative, there could be only one such through hole 42 or more than two mutually parallel through holes 42 in the insert body 31. The thread milling inserts 30 may as a further alternative lack a through hole 42, wherein each thread milling insert 30 is configured to be releasably fixed to any of the insert seats in the tool body by means of suitable clamping means.

The insert body 31 of each thread milling insert 30 is provided with an axial abutment surface 41, which is located at the first end 31*a* of the insert body 31 and which is configured to abut against a corresponding axial support surface 11 in any of the first insert seats 10 when the thread milling insert 30 is mounted in the first insert seat in question and to abut against a corresponding axial support surface 21 in any of the second insert seat 20 when the thread milling insert 30 is mounted in the second insert seat in question. Thus, each insert seat 10, 20 is provided with an axial support surface 11, 21 configured for engagement with the axial abutment surface 41 on the insert body 31 of a thread milling insert 30 when the thread milling insert 30 is mounted in the insert seat 10, 20. In the illustrated embodiments, the axial support surface 11 in each first insert seat 10 is located at the second end 10*b* of the first insert seat and faces the front end 2*a* of the tool body 2, whereas the axial support surface 21 in each second insert seat 20 is located at the first end 20*a* of the second insert seat and faces the rear end 2*b* of the tool body 2. In this case, the first insert seats 10 may be open towards a front end surface 7 of the tool body 2, i.e. with the first end 10*a* of each first insert seat 10 formed as an opening in said front end surface 7. In an alternative embodiment (not shown), the axial support surface 11 in each first insert seat 10 is located at the first end 10*a* of the first insert seat and faces the rear end 2*b* of the tool body 2, whereas the axial support surface 21 in each second insert seat 20 is located at the second end 20*b* of the second insert seat and faces the front end 2*a* of the tool body 2.

In the illustrated embodiments, the axial abutment surface 41 on the insert body 31 of each thread milling insert 30 is formed by an end surface on the insert body 31 at the first end 31*a* thereof. The axial abutment surface 41 is preferably a plane surface that extends perpendicularly to the median plane MP of the insert body 31, wherein the axial support surface 11, 21 in each insert seat 10, 20 is a plane surface that extends perpendicularly to the longitudinal axis 4 of the tool body 2. However, the axial abutment surface 41 and the axial support surfaces 11, 21 may also have any other suitable and mutually matching shapes.

The insert body 31 of each thread milling insert 30 is also provided with a radial abutment surface 43 formed on a peripheral side 45 of the insert body opposite to the peripheral side 35 provided with the teeth 34, wherein this radial abutment surface 43 is configured to abut against a corresponding radial support surface 13 in any of the first insert seats 10 when the thread milling insert 30 is mounted in the first insert seat in question and to abut against a corresponding radial support surface 23 in any of the second insert seat 20 when the thread milling insert 30 is mounted in the second insert seat in question. The radial abutment surface 43 is preferably perpendicular to the axial abutment surface 41. Thus, each insert seat 10, 20 is provided with a radial support surface 13, 23 configured for engagement with the radial abutment surface 43 on the insert body 31 of a thread milling insert 30 when the thread milling insert 30 is mounted in the insert seat 10, 20. The radial support surface 13, 23 is preferably perpendicular to the axial support surface 11, 21.

In the illustrated embodiments, each thread milling insert 30 is configured to be releasably fixed to any of the insert seats 10, 20 in the tool body 2 by means of two fastening elements 8 in the form of screws, which extend through a respective one of the through holes 42 in the insert body 31 of the thread milling insert and is engaged in a threaded hole 12, 22 (see FIGS. 2-4 and 12-14) in a tangential support surface 14, 24 in the insert seat. Each fastening element 8 comprises an elongated shaft 8*a*, which is provided with an external thread configured for engagement with a corresponding internal thread in any of said threaded holes 12, 22, and a head 8*b*, which is fixed to the shaft 8*a*. The shaft 8*a* has an external diameter that is smaller than the internal diameter of the through holes 42 in the insert body 31 such that the shaft 8*a* is receivable with play in any of the through holes 42, as illustrated in FIGS. 7, 8, 17 and 18. Each through hole 42 is provided with a conically shaped internal surface 42*a* at each of its ends configured for engagement with a corresponding conically shaped external surface 8*c* on the head 8*b* of each fastening element. When a fastening element 8 is threaded into one of the threaded holes 12, 22 in any of the insert seats 10, 20 with the shaft 8*a* of the fastening element 8 received in one of the through holes 42 in the insert body 31 of a thread milling insert 30 positioned in the insert seat in question, the conically shaped external surface 8*c* on the head 8*b* will come into engagement with one of the conically shaped internal surfaces 42*a* in the through hole 42 and thereby push the insert body 31 against the axial support surface 11, 21 in the insert seat.

According to the invention, the thread milling inserts 30 are so adapted to the first and second insert seats 10, 20 that each thread milling insert 30 is:

- mountable in any of the first insert seats 10 in one single working position with the axial abutment surface 41 on the insert body 31 of the thread milling insert abutting against the axial support surface 11 in the first insert seat 10 in question and with one of the first and second groups of cutting edges 40*a*, 40*b* in an active cutting position, and
- mountable in any of the second insert seats 20 in one single working position with the axial abutment surface 41 on the insert body 31 of the thread milling insert abutting against the axial support surface 21 in the second insert seat 20 in question and with the other one of said first and second groups of cutting edges 40*a*, 40*b* in an active cutting position.

In the illustrated embodiments:

- the first group of cutting edges 40*a* of a thread milling insert 30 is always in the active cutting position when the thread milling insert is mounted in one of the first insert seats 10, wherein the second major face 33 of the insert body 31, or at least a portion thereof, abuts against the tangential support surface 13 in the insert seat 10 in question; and
- the second group of cutting edges 40*b* of a thread milling insert 30 is always in the active cutting position when the thread milling insert is mounted in one of the second insert seats 20, wherein the first major face 32 of the insert body 31, or at least a portion thereof, abuts against the tangential support surface 23 in the insert seat 20 in question.

In the embodiments illustrated in FIGS. 1-20, the shape of the insert body 31 of each thread milling insert 30 is so adapted to the shape of the first and second insert seats 10, 20 that the insert body 31 fits into any of the first insert seats 10 only in a position with the axial abutment surface 41 on the insert body 31 abutting against the axial support surface 11 in the first insert seat 10 and into any of the second insert seats 20 only in a position with the axial abutment surface 41 on the insert body 31 abutting against the axial support surface 21 in the second insert seat 20.

In the embodiments illustrated in FIGS. 1-20, the insert body 31 of each thread milling insert 30 has a first end section 46*a* at its first end 31*a* with a shape that differs from the shape of a corresponding second end section 46*b* at its opposite second end 31*b*. In order to ensure a correct mounting of the thread milling inserts 30 in the insert seats 10, 20, each one of the first and second insert seat 10, 20 has a first end section 16*a*, 26*a* (see FIGS. 3, 4, 13 and 14) at one 10*b*, 20*a* of its ends with a shape adapted to the shape of the first end section 46*a* of the insert body 31 of each thread milling insert 30 and a differently shaped second end section 16*b*, 26*b* (see FIGS. 3, 4, 13 and 14) at its other end 10*a*, 20*b* with a shape adapted to the shape of the second end section 46*b* of the insert body 31 of each thread milling insert 30.

In the embodiments illustrated in FIGS. 1-20, the above-mentioned first end section 46*a* of the insert body 31 comprises an inclined peripheral side surface 47, which forms a connection between the axial and radial abutment surfaces 41, 43 on the insert body 31 and which is configured to face a corresponding inclined surface 17, 27 at the first end section 16*a*, 26*a* of any of the first and second insert seats 10, 20 when the thread milling insert 30 is mounted in the insert seat in question. The opposite second end section 46*b* of the insert body 31 lacks such an inclined peripheral side surface to thereby prevent the second end section 46*b* of the insert body 31 to fit into the first end section 16*a*, 26*a* of any of the first and second insert seats 10, 20. The above-mentioned inclined surfaces 17, 27 form a respective bevelled corner at the first end section 16*a*, 26*a* of the first and second insert seats 10, 20 that, together with the non-inclined second end section 46*b* of the insert body 31, will prevent the thread milling insert 31 from being mounted in any of the insert seats 10, 20 with the second end 31*b* of the insert body facing the axial support surface 11, 21 in the insert seat.

Figure 21:
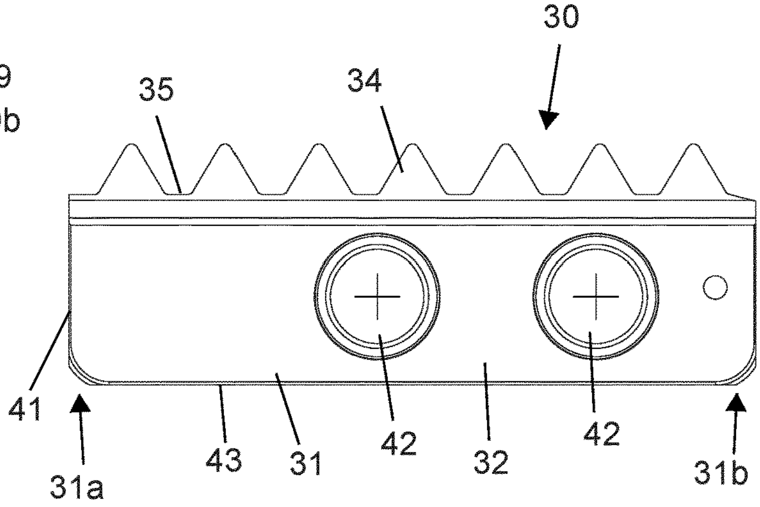
FIG. 21 is a lateral view of a thread milling insert of an alternative variant.

In the embodiment illustrated in FIG. 21, the first and second ends 31*a*, 31*b* of the insert body 31 of the thread milling insert 30 have the same shape. In this case, the positions of the through holes 42 in the insert body 31 have been moved towards the second end 31*b* of the insert body, as compared to the symmetric arrangement of the through holes 42 in the insert body 31 in the embodiments illustrated in FIGS. 1-20. In the embodiment illustrated in FIG. 21, the asymmetric arrangement of the through holes 42 in the insert body 31 and a corresponding arrangement of the threaded holes 12, 22 in the insert seats 10 20 ensure that the thread milling insert 30 can only be mounted in one single working position in each insert seat 10, 20.

In the illustrated embodiments, the insert body 31 of each thread milling insert 30 has:

mirror symmetry with respect to the median plane MP of the insert body 31, mirror asymmetry with respect to any other plane across the insert body 31, and rotational asymmetry with respect to any axis across the insert body 31.

Thus, in this case, the first and second major faces 32, 33 of the insert body 31 are identical to each other, within manufacturing tolerances, and are mirror symmetrical to each other with respect to the median plane MP of the insert body 31.

In the embodiment illustrated in FIGS. 1-8, the first and second insert seats 10, 20 have such axial positions in relation to each other in the tool body 2 that the axial distance between the tooth 34 closest to the second end 10*b* of a first insert seat 10 on a thread milling insert 30 mounted in any of the first insert seats 10 and the tooth 34 closest to the first end 20*a* of an adjacent second insert seat 20 on a thread milling insert 30 mounted in this second insert seat 20 is substantially equal to the axial distance between two adjacent teeth 34 on any of these thread milling inserts.

In the embodiment illustrated in FIGS. 11-18, the first and second insert seats 10, 20 have such axial positions in relation to each other in the tool body 2 that the tooth 34 closest to the second end 10*b* of a first insert seat 10 on a thread milling insert 30 mounted in any of the first insert seats 10 and the tooth 34 closest to the first end 20*a* of an adjacent second insert seat 20 on a thread milling insert 30 mounted in this second insert seat 20 are located at the same axial position in the tool body 2 and thereby overlap each other, as seen in the longitudinal direction of the tool body 2.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A thread milling tool comprising:

an elongated tool body having a front end and an opposite rear end, the rear end being configured for attachment to a machine, wherein a longitudinal axis of the tool body extends between the rear end and the front end of the tool body;

at least one pair of insert seats provided in the tool body and including a first insert seat and a second insert seat, the first and second inserts seats being angularly offset from each other with respect to the longitudinal axis of the tool body and axially offset from each other in the longitudinal direction of the tool body with the first insert seat being located closer to the front end of the tool body than the second insert seat, wherein each one of the first and second insert seats has a first end and an opposite second end, the first end of each one of the first and second insert seats being arranged closer to the front end of the tool body than the opposite second end of the same insert seat; and several substantially geometrically identical thread milling inserts, each being detachably mountable in a respective insert seat of the at least one pair of insert seats and comprising:

an elongated insert body having a first end and an opposite second end, wherein the insert body includes first and second major faces arranged on opposite sides of the insert body and serving as top and bottom faces of the thread milling insert, and wherein the insert body is provided with an axial abutment surface, which is located at the first end of the insert body and which is configured to abut against a corresponding axial support surface in the first insert seat when the thread milling insert is mounted in the first insert seat and to abut against a corresponding axial support surface in the second insert seat when the thread milling insert is mounted in the second insert seat, and a plurality of teeth arranged one after the other in a row along a peripheral side of the insert body that is located between the first and second major faces and that extends between the first and second ends of the insert body, wherein each tooth of the plurality of teeth has a first cutting edge on a first side of the tooth facing the first major face and a second cutting edge on an opposite second side of the tooth facing the second major face, the first cutting edges of the plurality of teeth forming a first group of cutting edges and the second cutting edges of the plurality of teeth forming a second group of cutting edges, wherein the first group of cutting edges and the second group of cutting edges are mirror symmetrical to each other with respect to a median plane of the insert body that extends halfway between the first and second major faces of the insert body, wherein the axial support surfaces in the first and second insert seats of said at least one pair of insert seats are arranged:

with the axial support surface in the first insert seat located at the second end of the first insert seat and facing the front end of the tool body, and the axial support surface in the second insert seat located at the first end of the second insert seat and facing the rear end of the tool body, or with the axial support surface in the first insert seat located at the first end of the first insert seat and facing the rear end of the tool body, and the axial support surface in the second insert seat located at the second end of the second insert seat and facing the front end of the tool body; and each one of the thread milling inserts is configured with the first and second insert seats of said at least one pair of insert seats such that the thread milling insert is:

mountable in the first insert seat in one single working position with the axial abutment surface on the insert body of the thread milling insert abutting against the axial support surface in the first insert seat and with one of said first and second groups of cutting edges in an active cutting position, mountable in the second insert seat in one single working position with the axial abutment surface on the insert body of the thread milling insert abutting against the axial support surface in the second insert seat and with the other one of said first and second groups of cutting edges in an active cutting position, and wherein the shape of the insert body of each one of the thread milling inserts is so configured to the shape of the first and second insert seats of said at least one pair of insert seats such that the insert body fits into the first insert seat only in a position with the axial abutment surface on the insert body abutting against the axial support surface in the first insert seat and into the second insert seat only in a position with the axial abutment surface on the insert body abutting against the axial support surface in the second insert seat.

2. The thread milling tool according to claim 1, wherein the insert body of each one of the thread milling inserts having a mirror symmetry with respect to the median plane of the insert body, a mirror asymmetry with respect to any other plane across the insert body, and rotational asymmetry with respect to any axis across the insert body.

3. The thread milling tool according to claim 1, wherein the insert body of each one of the thread milling inserts has an end section at its first end with a shape that differs from a shape of a corresponding end section at its second end.

4. The thread milling tool according to claim 1, wherein said plurality of teeth are at least three in number.

5. The thread milling tool according to claim 1, wherein the first and second insert seats of said at least one pair of insert seats have such axial positions in relation to each other in the tool body that the axial distance between the tooth closest to the second end of the first insert seat on a first one of the thread milling inserts mounted in the first insert seat and the tooth closest to the first end of the second insert seat on a second one of the thread milling inserts mounted in the second insert seat is substantially equal to the axial distance between two adjacent teeth on any of these thread milling inserts.

6. The thread milling tool according to claim 1, wherein the first and second insert seats of said at least one pair of insert seats have such axial positions in relation to each other in the tool body that the tooth closest to the second end of the first insert seat on a first one of the thread milling inserts mounted in the first insert seat and the tooth closest to the first end of the second insert seat on a second one of the thread milling inserts mounted in the second insert seat are located at the same axial position in the tool body and thereby overlap each other in the longitudinal direction of the tool body.

7. The thread milling tool according to claim 1, wherein two or more such pairs of insert seats are provided in the tool body, wherein the first insert seats of the different pairs of insert seats are located at the same axial position in the tool body and are evenly distributed about the longitudinal axis of the tool body, and wherein the second insert seats of the different pairs of insert seats are located at the same axial position in the tool body and are evenly distributed about the longitudinal axis of the tool body.

8. The thread milling tool according to claim 1, wherein the axial abutment surface on the insert body of each one of the thread milling inserts is formed by an end surface on the insert body at the first end thereof.

9. The thread milling tool according to claim 8, wherein the insert body of each one of the thread milling inserts includes a radial abutment surface, which is formed on a peripheral side of the insert body opposite to the peripheral side provided with said teeth and which is configured to abut against a corresponding radial support surface in any of the first and second insert seats when the thread milling insert is mounted in one of the first and second insert seats, and an inclined peripheral side surface, which forms a connection between the axial and radial abutment surfaces on the insert body and which is configured to face a corresponding inclined surface in any of the first and second insert seats when the thread milling insert is mounted in one of the first and second insert seats.

* * * * *